United States Patent
Joanny et al.

(10) Patent No.: US 9,058,211 B2
(45) Date of Patent: Jun. 16, 2015

(54) PRE-VALIDATION IN A COMPUTING ON DEMAND SYSTEM

(75) Inventors: Patrick M. Joanny, Silver Spring, MD (US); Adam Davis, Silver Spring, MD (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 516 days.

(21) Appl. No.: 12/963,926

(22) Filed: Dec. 9, 2010

(65) Prior Publication Data

US 2012/0151358 A1    Jun. 14, 2012

(51) Int. Cl.
*G06F 15/16*    (2006.01)
*G06F 9/50*    (2006.01)

(52) U.S. Cl.
CPC ........ *G06F 9/5011* (2013.01); *G06F 2209/503* (2013.01)

(58) Field of Classification Search
None
See application file for complete search history.

(56) References Cited

U.S. PATENT DOCUMENTS

| | | | |
|---|---|---|---|
| 8,046,694 B1 * | 10/2011 | Lappas et al. | 715/740 |
| 8,260,893 B1 * | 9/2012 | Bandhole et al. | 709/223 |
| 8,799,431 B2 * | 8/2014 | Pabari | 709/223 |
| 2002/0191539 A1 * | 12/2002 | Rawlins et al. | 370/229 |
| 2009/0006585 A1 * | 1/2009 | Chen | 709/220 |
| 2009/0019137 A1 * | 1/2009 | Mishra et al. | 709/220 |
| 2010/0191881 A1 * | 7/2010 | Tauter et al. | 710/104 |
| 2011/0072505 A1 * | 3/2011 | Ott | 726/11 |
| 2011/0213886 A1 * | 9/2011 | Kelkar et al. | 709/226 |
| 2012/0084406 A1 * | 4/2012 | Kumbalimutt | 709/220 |
| 2012/0084443 A1 * | 4/2012 | Theimer et al. | 709/226 |
| 2013/0097293 A1 * | 4/2013 | Gibson et al. | 709/221 |

* cited by examiner

*Primary Examiner* — William Bashore
*Assistant Examiner* — Hien Duong

(57) ABSTRACT

A method and system may receive a request to provision one or more computing resources, such as a physical or virtual server based on configuration information received from a user via a web portal. An availability of the one or more computing resources may be pre-validated. When the pre-validating for all of the one or more computing resources is not successful, an alert message may be output to the user via the web portal indicating that one or more of the requested computing resources is not available. When the pre-validating for all of the one or more computing resources is successful, one or more jobs may be queued in a jobs database based on the request to provision the one or more computing resources, dequeued by a workflow engine, and executed to configure the one or more computing resources.

19 Claims, 14 Drawing Sheets

PRE-VALIDATION IN A COMPUTING ON DEMAND SYSTEM

BACKGROUND INFORMATION

A system or network developer may sometimes purchase and stage devices to build a system or network, such as server devices, load balancers, firewalls, etc. When purchasing the devices, the system developer may evaluate device specifications, price, and/or equipment compatibility in light of particular project requirements. When staging the devices, the system developer may install operating systems, applications, databases and web servers, may apply patches, and/or may configure the devices.

DETAILED DESCRIPTION OF PREFERRED EMBODIMENTS

The following detailed description refers to the accompanying drawings. The same reference numbers in different drawings may identify the same or similar elements.

As described below, a system may provision both virtual resources and physical resources. When a user wishes to obtain computing resources (e.g., a network, a server, an application, a web server, etc.), the user may connect to an integrated provisioning system via a web portal. Once connected via a web interface, the user may input parameters that describe the desired resources. Based on the parameters, the integrated resource provisioning system initially performs pre-validation of the requested resources to determine whether the requested resources may be provisioned to the user.

If pre-validation determines that the resources are available and able to be provisioned, the integrated resource provisioning system may provision and allocate virtual and/or physical resources without manual intervention from a system administrator or an operator. If pre-validation determines that at least one aspect or component of the requested resources is not available or is not able to be provisioned, the user may be notified of the error condition (e.g., via the web portal), and a corresponding alert may be transmitted to network services personnel for handling.

Figure 1:
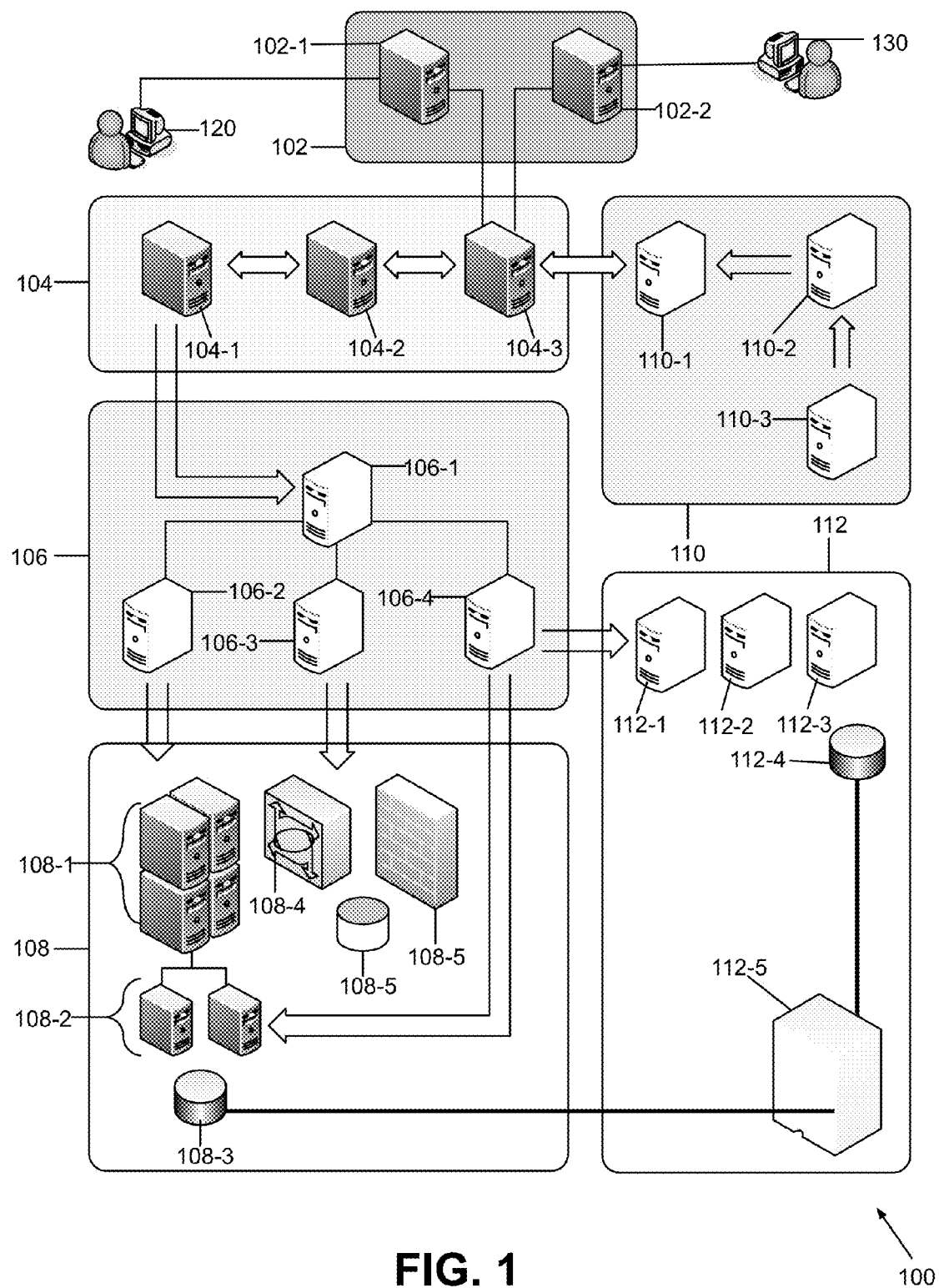
FIG. 1 is a diagram illustrating an exemplary network in which concepts described herein may be implemented.

FIG. 1 is a diagram illustrating an exemplary network in which concepts described herein may be implemented. In one implementation, network 100 may include one or more wired and/or wireless networks that are capable of exchanging information, such as voice, video, data, multimedia information, text, etc. For example, network 100 may include one or more public switched telephone networks (PSTNs) or another type of switched network. Network 100 may also include one or more wireless networks and may include a number of transmission towers for receiving wireless signals and relaying the received signals toward the intended destination. Network 100 may further include one or more packet switched networks, such as an Internet Protocol (IP) based network, a local area network (LAN), a wide area network (WAN), a personal area network (PAN), an intranet, the Internet, or another type of network that is capable of exchanging information.

As shown, network 100 may include a presentation network 102, resource management network 104, workflow network 106, virtual system network 108, inventory management network 110, and physical resource network 112. For simplicity and ease of understanding, network 100 of FIG. 1 does not show other network or network components, such as bridges, routers, switches, wireless devices, etc. Depending on the implementation, network 100 may include additional, fewer, or different networks and/or network components.

Presentation network 102 may include devices that interact with users and system administrators. As further shown in FIG. 1, presentation network 102 may include an administrator portal device 102-1 and a user portal device 102-2. Administrator portal device 102-1 may interact with and relay information between a system administrator device, shown as item 120, and resource management network 104. Through the interaction, system administrator device 120 may perform system/network administration tasks (e.g., managing user accounts, performing an action that a user is not authorized to perform, etc.).

User portal device 102-2 may interact with and relay information between a user device, illustrated as item 130, and resource management network 104. User device 130 may access provisioning services that are available via user portal device 102-2. For example, user device 130 may request resource management network 104 to create a virtual machine, provision a physical server, configure a load balancer or firewall, etc.

Resource management network 104 may provide provisioning services. In providing the provisioning services, resource management network 104 may track pools of resources that are available to user device 130, reserve a portion of the resources based on a request from user device 130, and allocate the reserved resources to user device 130. In addition, resource management network 104 may deallocate the resources (e.g., return the portion to the pool) when user device 130 indicates that the user does not need the resources.

In addition, resource management network 104 may provide support for administrative tasks (e.g., administer user, perform resource allocation tasks that a user is not authorized to perform, etc.) and/or configuration tasks.

As further shown in FIG. 1, resource management network 104 may include a job database device 104-1, resource manager database 104-2, and resource management device 104-3. Job database device 104-1 may receive a job description (e.g., a list of tasks) from resource management device 104-3 and store it in an active job queue until the job is performed. Resource manager database 104-2 may store and/or retrieve configuration/usage data pertaining to a particular user and/or other bookkeeping information.

Resource management device 104-3 may receive a request for services from administrator/user device 120/130 via portal devices 102-1 and 102-2, and render the requested services. In rendering the services, resource management device 104-3 may execute functions that are listed in FIG. 5. For example, resource management device 104-3 may determine whether the requested resources or services are available and able to be provisioned as requested. This process is also referred to as pre-validation.

The services that resource management device 104-3 renders may also include provisioning/de-provisioning resources based on inventory information provided by inventory management network 110. To provision/de-provision the resources (e.g., cluster), resource management device 104-3 may create a description of a job based on: user input relayed by user portal device 102-2; user configuration; and/or available resources. Resource management device 104-3 may handoff the job description to job database device 104-1, to be placed in the active job queue. In some implementations, resource management device 104-3 may provision multiple servers, allocate Internet Protocol (IP) addresses to the servers, provision a storage space shared by the servers, create a virtual machine or server, create a cluster from the servers, configure devices or components of network 100, such as a load balancer or firewall.

In providing the services, resource management device 104-3 may manage resource objects that correspond to physical or virtual resources in networks 102-112. Thus, for example, when user device 130 requests information relating to a physical server via user portal device 102-2, resource management device 104-3 may provide user device 130 with information from the resource object representing the physical server. Resource management device 104-3 may receive data for instantiating the resource objects from one or more databases in networks 102-112 (e.g., a database in network 110).

Workflow network 106 may perform jobs whose descriptions are in the active job queue at job database device 104-1. Once the job is performed, workflow network 106 may instruct job database device 104-1 to dequeue the job description (e.g., provisioning a server, creating a cluster, etc.). As further shown in FIG. 1, workflow network 106 may include a workflow engine device 106-1, virtual machine management (VMM) control device 106-2, network management device 106-3, and resource lifecycle management device 106-4.

Workflow engine device 106-1 may perform subtasks of a job as defined by a job description in the active job queue at job database device 104-1. In one implementation, workflow engine device 106-1 may poll the active job queue to detect the job description. Workflow engine device 106-1 may request job database device 104-1 to remove the job description from the queue when the subtasks are completed.

In driving/performing each of the subtasks of a job, workflow engine device 106-1 may employ VMM control device 106-2, network management device 106-3, and/or resource lifecycle management device 106-4. Each of the subtasks in the job description may entail allocation, deallocation, controlling, and/or monitoring of virtual resources, physical resources, and/or network resources. For example, assume that user device 130 requests resource management device 104-3 to allocate a virtual machine. In response, resource management device 104-3 may create a job description that includes subtasks for creating a virtual machine, and place the job description at job database device 104-1. When workflow engine device 106-1 is about to perform the subtasks associated with creating the virtual machine, work flow engine device 106-1 may dispatch one or more requests for performing virtual machine-related functions to VMM control device 106-2 (e.g., a request to create the virtual machine, clone a virtual machine, etc.). VMM control device 106-2, upon receiving requests from workflow engine device 106-1, may control and/or monitor one or more virtual machines by interacting with hypervisors. The term "hypervisor," as used herein, may refer to a program that monitors, creates, runs, removes, and/or controls a virtual machine (e.g., controls a lifecycle of a virtual machine) on a physical device. For example, when VMM control device 106-2 receives a request to create a virtual machine from workflow engine device 106-1, VMM control device 106-2 may issue a command to a hypervisor. The hypervisor may create the virtual machine on the host device.

Network management device 106-3 may perform network configuration functions on behalf of workflow engine device 106-1. The functions may include configuring network infrastructure components. FIG. 1 shows a number of different types of network objects that network management device 106-3 may manage, such as, for example, a virtual load balancer 108-4, virtual LAN 108-5, and virtual firewall 108-6.

Resource lifecycle management device 106-4 may perform subtasks for provisioning a physical hardware device for the user. For example, resource lifecycle management device 106-4 may install an operating system on a server, install an application, etc. As shown in FIG. 1, resource lifecycle management device 106-4 may act on physical server devices 112-1 through 112-3 as well as virtual machines 108-2, as described below.

Virtual system network 108 may include devices and/or components for hosting and implementing virtual machine-related and network component-related resources that may be provisioned for the user. As shown, these resources may include a hypervisor cluster 108-1, virtual machines 108-2, logical volume 108-3, virtual load balancer 108-4, virtual LAN 108-5, and virtual firewall 108-6.

Hypervisor cluster 108-1 may include a logical group of hypervisors and a hypervisor manager (not shown). When hypervisor cluster 108-1 receives a command or a request from VMM control device 106-2 (e.g., create a virtual machine), the hypervisor manager may issue a command/request to a hypervisor. The hypervisor may then create the virtual machine on a host device on which the hypervisor is installed. Depending on the implementation, the hypervisor may be hosted on a hardware device without an operating system, or alternatively, may be hosted as a software component running on top of an operating system.

Virtual machines 108-2 may include a software emulation of a computer system (e.g., a server, a personal computer, etc.). Each virtual machine 108-2 may be instantiated, removed, and managed by a hypervisor. Once created, user device 130 may utilize virtual machine 108-2 as if it were a physical device.

Logical volume 108-3 may include storage on a network (e.g., network attached storage (NAS), a disk on storage area network (SAN), etc.). Local volume 108-3 may be allocated as a resource by workflow engine device 106-1. Once allocated, logical volume 108-3 may be mounted on a mount point on a virtual machine and used as storage (e.g., a file system, swap space, etc.). Virtual load balancer 108-4 may include an emulation of load balancer, and may be instantiated or removed upon demand from user device 130. The user may configure virtual load balancer 108-4 such that network traffic is distributed over the virtual and/or physical resources in accordance with specified thresholds (e.g., 40% of network traffic to one of virtual machines 108-2 and 60% of network traffic the other virtual machine). In other implementations, load balancer 108-4 may be configured to distribute network traffic across virtual machines 108-2 in an even or "round robin" manner, Virtual LAN 108-5 may be created upon demand from user device 130. User device 130 may configure and place selected virtual and physical resources on specific virtual LAN 108-5. Virtual firewall 108-6 may include an emulation of a physical firewall, and may be instantiated or deleted and configured upon demand from user device 130. Once provisioned, virtual firewall 108-6 may be attached to virtual LAN 108-5 to protect the virtual and/or physical resources against undesired network traffic.

Inventory management network 110 may track inventory of network resources and provide inventory information to resource management network 104. As further shown in FIG. 1, inventory management network 110 may include IP address management device 110-1, data warehouse device 110-2, and an inventory management device 110-3.

IP address management device 110-1 may provision an IP address from a pool of IP addresses. In one implementation, in provisioning an IP address, IP address management device 110-1 may take into account network address translation schemes to identify which VLAN the IP address belongs to, such that an IP address conflict does not arise within the VLAN. When IP address management device 110-1 de-provisions an IP address, IP address management device 110-1 may return the IP address to a pool of IP addresses. In addition, IP address management device may maintain a listing or table of available IP addresses (e.g., in the pool of IP addresses).

Data warehouse device 110-2 may include database of inventory of resources that are available for provisioning, resources that have been provisioned for the user, and configuration management information. When a resource is added to a pool, is provisioned, or is de-provisioned, data warehouse device 110-2 may update/record the information (e.g., inventory information) about the resource into the database. In addition, data warehouse device 110-2 may write and insert data associated with configuration (e.g., a version of an operating system that is installed on a provisioned physical server, an IP address, etc.) into the database when resource configuration changes.

Inventory management device 110-3 may obtain inventory and configuration related information by monitoring physical devices, and pass the information to data warehouse device 110-2.

Physical resource network 112 may include physical resources. These physical resources may be provisioned/de-provisioned upon a request from resource lifecycle management device 106-4. When physical resources in physical resource network 112 are provisioned/de-provisioned, resource lifecycle management device 106-4 or inventory management device 110-3 may update data warehouse device 110-2 with information about the provisioning and configuration information.

As further shown in FIG. 1, physical resource network 112 may include physical resources 112-1 through 112-3 (individually referred to as physical resource 112-x and collectively as physical resources 112), logical volume 112-4, and storage device 112-5. Physical resource 112-x may include a physical device or a component that may be provisioned via resource lifecycle management device 106-4. Logical volume 112-4 may include similar component as logical volume 108-3, and may operate similarly. Unlike logical volume 108-3 that is mounted on a virtual machine, however, logical volume 112-3 may be mounted on physical resource 112-x. Storage device 112-5 may include storage from which logical volumes (e.g., logical volume 108-3 or 112-4) may be allocated. Examples of storage device 112-5 may include a SAN disk and NAS devices.

In FIG. 1, although each of networks 102 through 112 are shown as including a number of devices, in an actual implementation, networks 102 through 112 may include additional, fewer, or different components than those shown in FIG. 1. In addition, depending on the implementation, functionalities of each of the devices within networks 102-112 may be aggregated over fewer devices or distributed over additional devices. For example, in one implementation, functionalities of devices 112-1 through 112-3 in resource management network 112 may be provided by a single server device.

Figure 2:
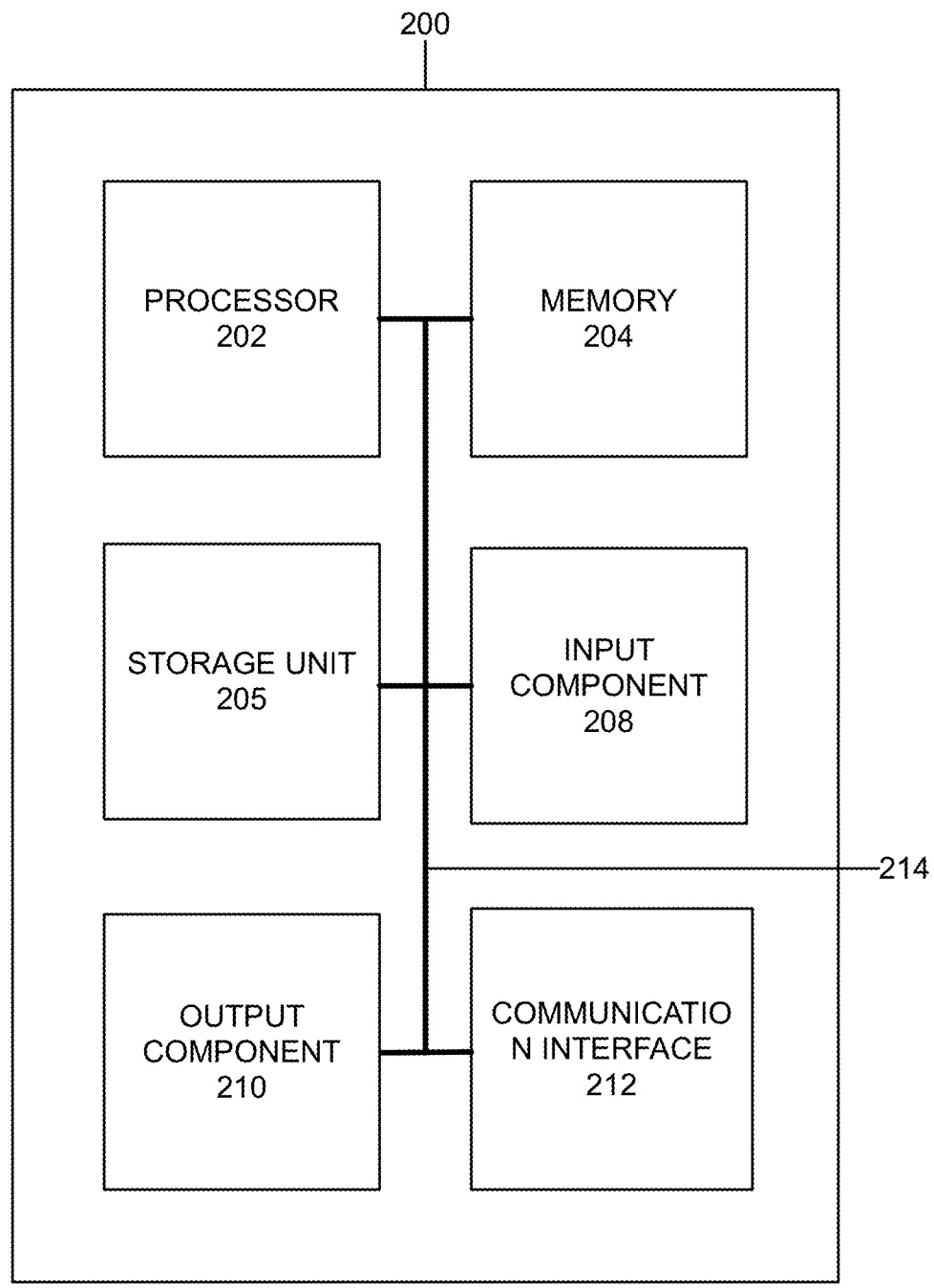
FIG. 2 is a block diagram of an exemplary network device shown in FIG. 1.

FIG. 2 is a block diagram of an exemplary network device 200. Network device 200 may be used to implement each of devices 104-1 through 104-3, 106-1 through 106-4, 110-1 through 110-3, 112-1 through 112-3, and 112-5. In addition, network device 200 may also be used to implement components of a device that hosts a hypervisor. As shown in FIG. 2, network device 200 may include a processor 202, memory 204, storage unit 206, input component 208, output component 210, communication interface 212, and bus 214.

Processor 202 may include one or more processors, microprocessors, application specific integrated circuits (ASICs), field programmable gate arrays (FPGAs), or other processing logic that may interpret and execute instructions. Memory 204 may include static memory, such as read only memory (ROM), and/or dynamic memory, such as random access memory (RAM) or onboard cache, for storing data and machine-readable instructions. Storage unit 206 may include a magnetic and/or optical storage/recording medium. In some embodiments, storage unit 206 may be mounted under a directory tree or may be mapped to a drive. In some implementations, storage unit 206 may be part of another network device (e.g., storage device 112-5) or a network (e.g., storage area network (SAN)). Depending on the context, the term "medium," "memory," "storage," "storage device," "storage medium," and/or "storage unit" may be used interchangeably. For example, a "computer-readable storage device" or "computer readable storage medium" may refer to both a memory and/or storage device.

Input component 208 may permit a user to input information to network device 200. Input component 208 may include, for example, a keyboard, a keypad, a mouse, a pen, a microphone, a touch screen, voice recognition and/or biometric mechanisms, etc. Output component 210 may include a mechanism that outputs information to the user. Output component 210 may include, for example, a display, a printer, a speaker, etc. In some implementations, because network device 200 may operate as a server device, network device 200 may include a minimal number of input components 208 and output components 210 (e.g., a keyboard and/or a console), to minimize cost and to increase robustness.

Communication interface 212 may enable network device 200 or the components of network device 200 to communicate with other devices and/or systems via a network, and may include one or more network interface cards (e.g., an Ethernet interface) for communicating with other devices. In one implementation, communication interface 212, for example, may be attached to a server blade that hosts processor 202. Bus 214 may provide an interface through which components of network device 200 can communicate with one another.

In FIG. 2, network device 200 is illustrated as including components 202-212 for simplicity and ease of understanding. In an actual implementation, network device 200 may include additional, fewer, or different components. For example, assuming that network device 200 is a virtual machine, components 202-212 may include virtual components. In another example, network device 200 may include one or more power supplies, fans, motherboards, video cards, etc. In yet another example, the components of network device 200 may be distributed over a network.

Figure 3:
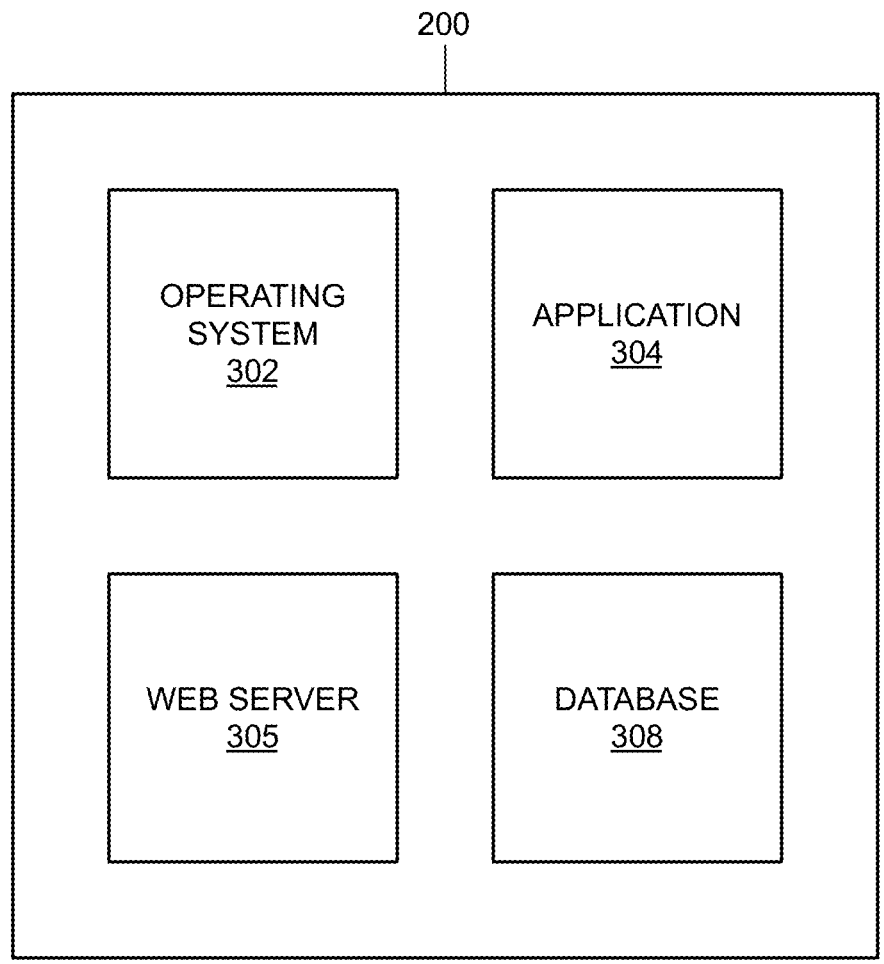
FIG. 3 is a block diagram illustrating exemplary functional components of the network devices shown in FIG. 1.

FIG. 3 is a block diagram illustrating exemplary functional components of network device 200. As shown, network device 200 may include an operating system 302, application 304, web server 306, and database 308. Depending on the implementation, network device 200 may include additional, fewer, or different components than those illustrated in FIG. 3.

Operating system 302 may manage hardware and software resources of network device 200. Operating system 302 may manage, for example, its file system, device drivers, communication resources (e.g., transmission control protocol (TCP)/IP stack), event notifications, etc.

Application 304 may include software program and/or scripts for rendering services. For example, in resource management device 104-3, application 304 may take the form of one or more programs for provisioning resources. Other examples of application 304 include a file transfer protocol (FTP) server, an email server, a telnet server, servlets, Java™ virtual machine (JVM), web containers, firewall, components to support Authorization, Authentication and Accounting (AAA), and other applications that either interact with client applications or operate in stand-alone mode. In addition, application 304 may include a specialized server program, application server, web page, etc.

Web server 306 may include a software application for exchanging web page related information with one or more browsers and/or client applications. Database 308 may include records and files and may act as an information repository for network device 200. For example, in resource manager database 104-2, database 308 may store and retrieve configuration/usage data pertaining to a particular user. In another example, database 308 in job database device 104-1 may implement persistent queues for storing job descriptions. In such implementations, the queue may be robust and, therefore, recoverable upon device failure.

Figure 4:
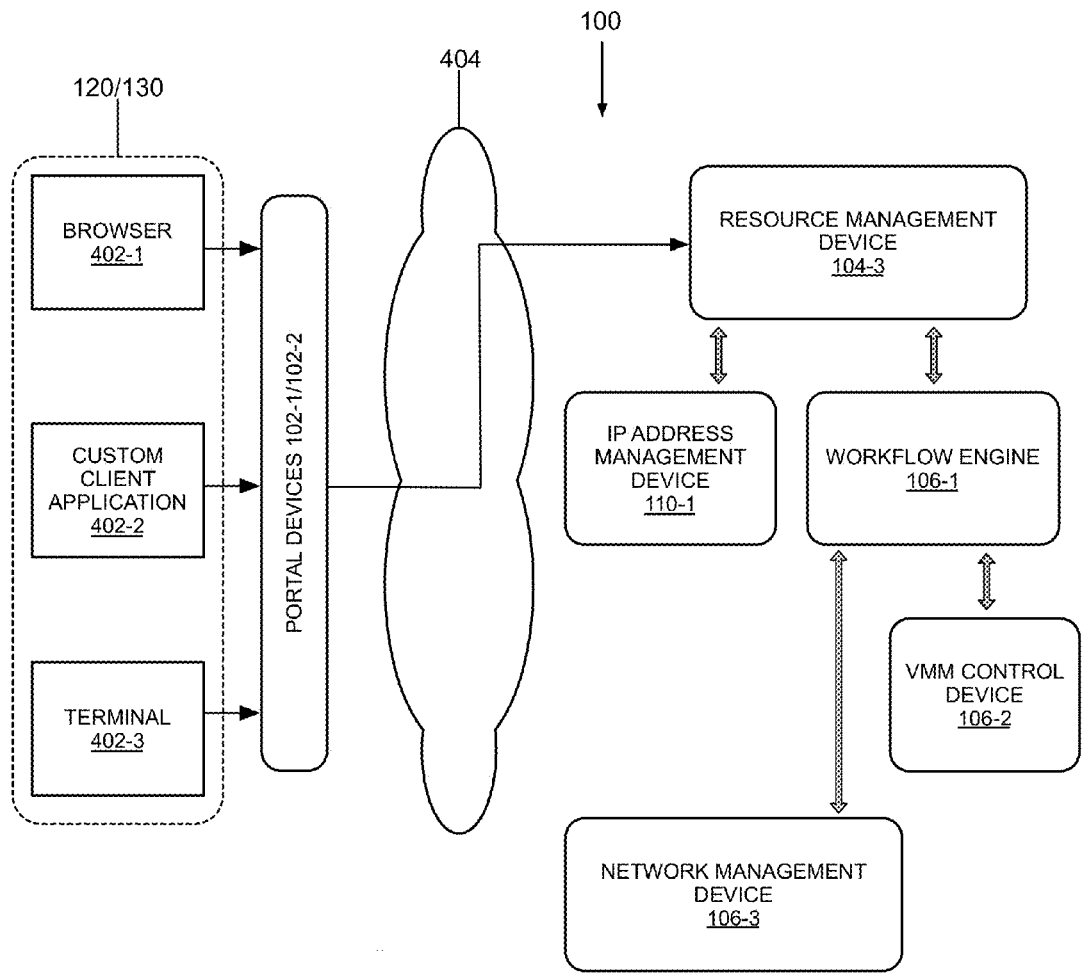
FIG. 4 illustrates an exemplary interaction between a user device, resource management device, workflow engine, load balancer, firewall, and storage devices of FIG. 1 for provisioning and/or managing resources.

FIG. 4 illustrates interaction between administrator/user device 120/130, portal devices 102-1 and/or 102-2, resource management device 104-3, IP address management device 110-1, workflow engine 106-1, VMM control device 106-2, and network management device 106-3 for pre-validating the provisioning and/or managing of resources associated with network 100. As shown in FIG. 4, administrator/user device 120/130 may interact with resource management device 104-3, IP address management device 110-1, and VMM control device 106-2 over network 404. Network 404 may be part of network 100, and may include network or network devices, such as user portal device 102-2, resource management device 104-3, etc.

As further shown in FIG. 4, administrator/user device 120/130 may host different types of client applications, such as a browser 402-1, custom client application 402-2, and/or terminal 402-3 (e.g., xterm). Browser 402-1 may include a web browser (e.g., Internet Explorer, Firefox, etc.). Custom client application 402-2 may include a software component specifically designed for interacting with VMM control device 106-2 and/or hypervisor cluster 108-1. Terminal 402-3 may include a command line based client terminal for remotely accessing different services, such as telnet services, FTP services, etc.

In the manner set forth above, users may initiate provisioning of network or server resources in network 100. Prior to executing (or attempting to execute) the provisioning requests (e.g., via workflow engine 106-1), portal devices 102-1/102-2 may perform pre-validation of the requested resources/services on network 100. More specifically, based on the received provisioning request, portal devices 102-1/102-2 may initiate requests for and receipt of status information relating to the requested resources. For example, resource management device 104-3 may extract availability information from IP address management device 110-1, VMM control device 106-2, network management device 106-3, etc. In some instances, requests for information may be relayed via tasks or operations performed by workflow engine 106-1 at the request of resource management device 104-3.

In FIG. 4, administrator/user device 120/130 may facilitate the provisioning or de-provisioning of network resources via browser 402-1. Through different devices (e.g., user portal device 102-2, etc.), a user's request for a service may initially reach resource management device 104-3. Resource management device 104-3 may, prior to carrying out any provisioning functions, perform pre-validation of the requests. In the event that one or more of the requested resources is not available or that provisioning of the resource is not available, a descriptive error message may be generated and displayed to the user via browser 402-1. In addition, a error ticket or alert regarding the pre-validation failure may be automatically forwarded to network support personnel.

Figure 5:
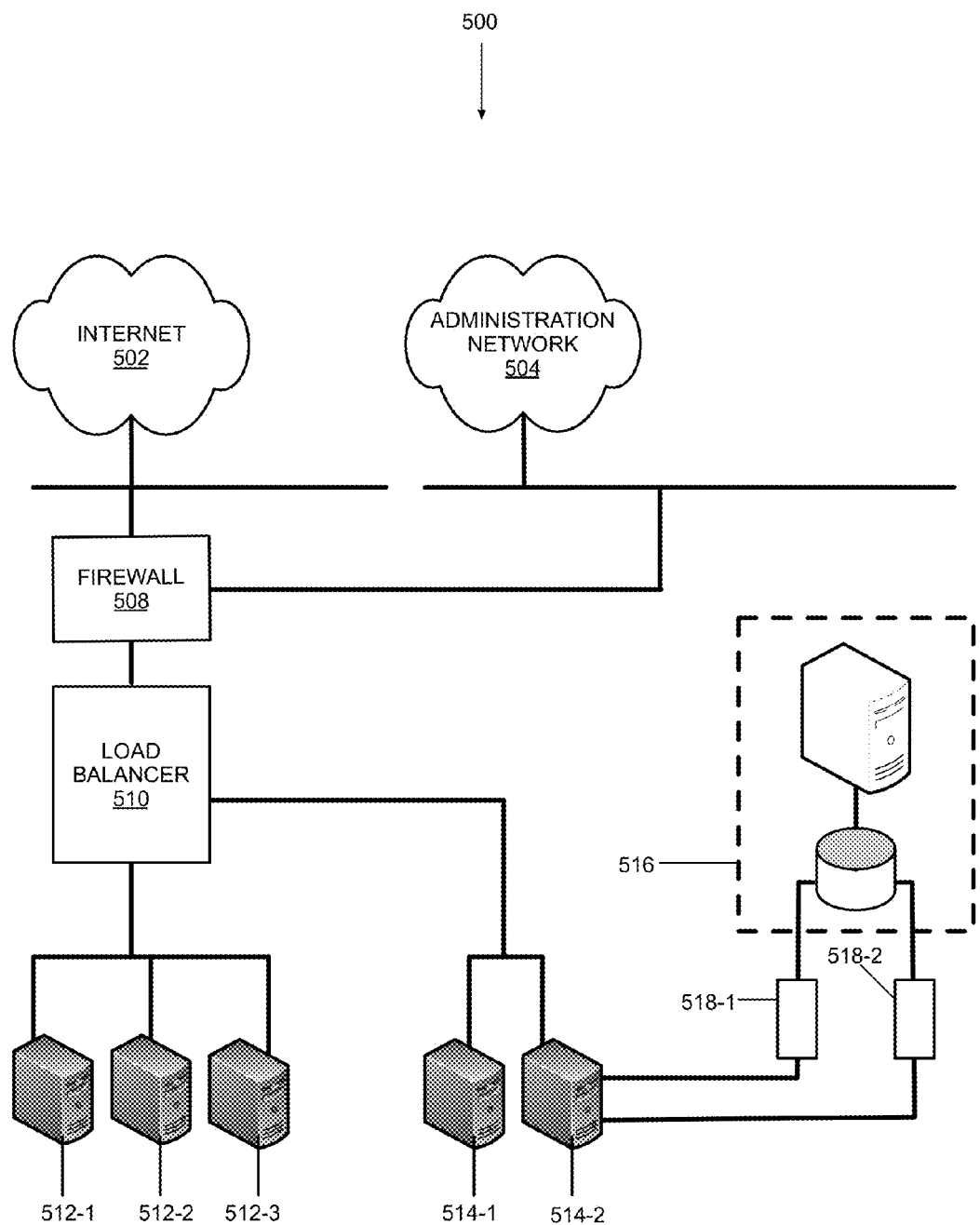
FIG. 5 is a diagram of exemplary resources that the system of FIG. 1 may provision.

FIG. 5 is a diagram of exemplary resources that network 100 of FIG. 1 may provision. As shown in FIG. 5, a user may be provisioned with connectivity to the Internet 502, administration network 504, firewall 508, load balancer 510, virtual server devices 512-1 through 512-3, physical server devices 514-1 and 514-2, storage device 516, and fiber channels 518-1 and 518-2.

Administration network 504 may provide services such as a backup service, security service, billing, etc. Firewall 508 may safeguard virtual server devices 512-1 through 512-3 and physical server devices 514-1 and 514-2 from outside networks via enforcement of firewall security rules and/or network address translation (NAT). Load balancer 510 may balance network traffic over different devices (e.g., load balance between virtual server devices 512-1 through 512-3 and physical server devices 514-1 and 514-2). In some implementations, firewall 508 and load balancer 510 may be provided as virtual devices incorporated into a single network device.

Virtual server devices 512-1 through 512-3 may host applications in virtual environments. Physical server devices 514-1 and 514 may host applications in physical devices. Each of physical server devices 514 may access storage device 516 via one of two channels 518-1 and 518-2, which are provided for redundancy in case of a fiber channel failure.

In the manner described above, the user at user device 130 may request network 100 to provision one or more devices 508-518 via user portal device 102-2. For example, via a web interface, a user at user device 130 may request to provision a virtual server device 512-1. In response to the request, the requested resources/services may be pre-validated (e.g., via resource management device 104-3) prior to generation and submission of related jobs to job database 104-1 for de-queuing and operation by workflow engine 106-1.

Figure 6:
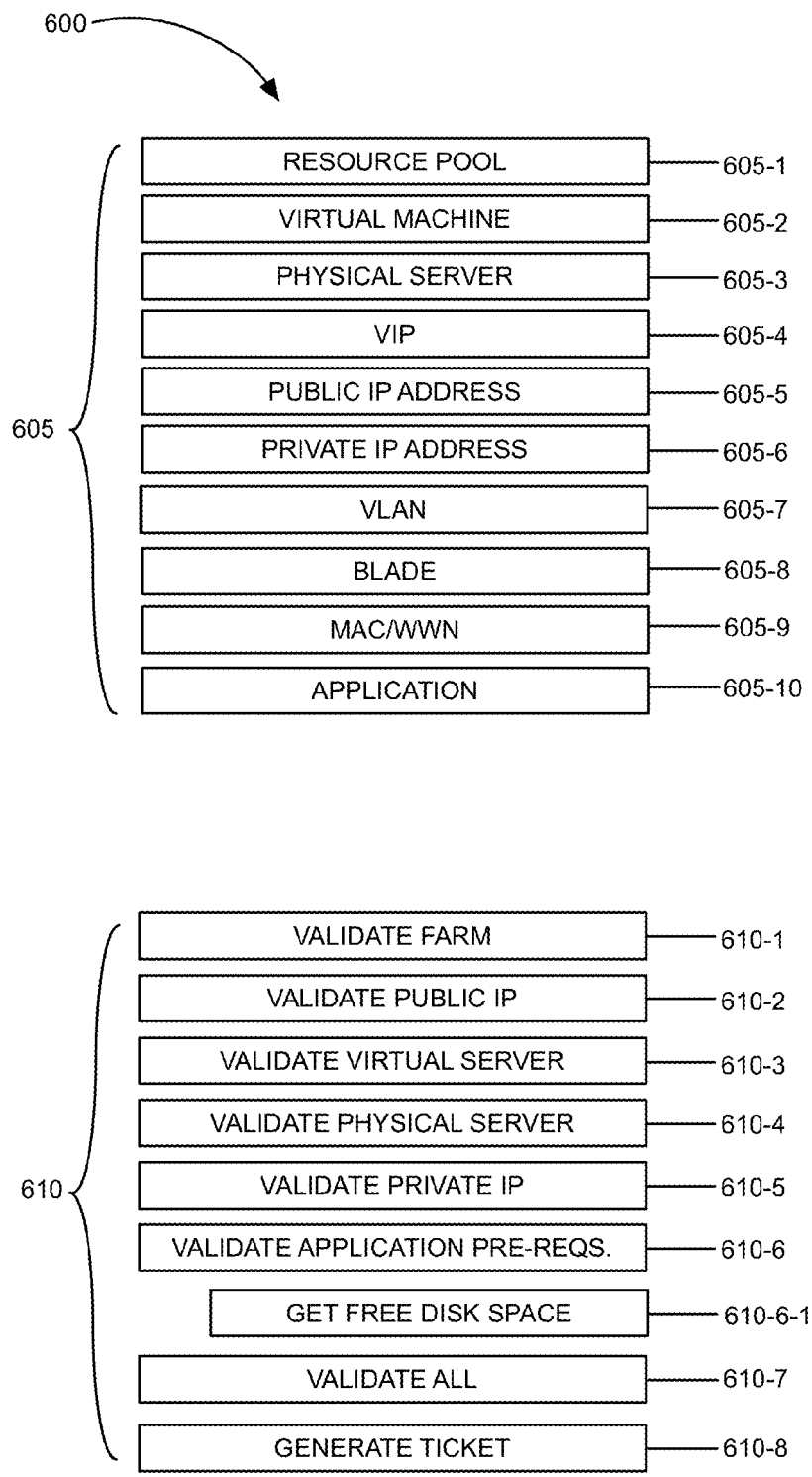
FIG. 6 illustrates a listing of exemplary resources and functions for pre-validating the resources.

FIG. 6 provides a listing of exemplary resources 605 that one or more devices in FIG. 1 may support for pre-validation and functions 610 to enable pre-validation of resources and services relating to the resources. As shown, one or more devices, such as portal devices 102 and/or resource management device 104-3 may be requested to perform, by another device (e.g., workflow engine device 106-1, IP address management device 110-1, etc.), functions 610-1 through 610-7 relating to pre-validating resources and/or services relating to resources 605-1 through 605-10. Depending on the implementation, other functions and/or resources may be supported.

As further shown in FIG. 6, resources 605 examined during pre-validation may include resource pool 605-1, virtual machine 605-2, physical server 605-3, virtual IP (VIP) 605-4, public IP address 605-5, private IP address 605-6, virtual local area network (VLAN) 605-7, blade 605-8, media access control (MAC) address/world wide name (WWN) 605-9, and application 605-10. Resource pool 605-1 may include a grouping (e.g., one or more) of servers, virtual machines, or other resources. In some embodiments, resource pool 605-1 may be referred to as a farm (e.g., a server farm). Virtual machine 605-2 may include a software emulation of a computer system (e.g., a virtual server). Physical server 605-3 may include a physical computing device for providing data via a network.

Virtual IP (VIP) 605-4 may include a grouping (e.g., one or more) of servers or other storage devices or resources across which load may be balanced by virtual load balancer 108-4. Public IP address 605-5 includes a publicly visible IP address associated with a server, resource, or VIP. Private IP address 605-6 may include IP address associated with a server, or resource. Virtual local area network (VLAN) 605-7 may include a group of hosts with a common set of requirements that communicate as if they were attached to the same local network. Blade 605-8 refers to a physical device for accommodating a virtual or physical machine (e.g., server). Media access control (MAC) address/world wide name (WWN) 605-9 refers to unique identifiers associated with network devices, such as servers. Application 605-10 may include a client program, server program, script, and/or another type of executable software component.

Functions 610 may include validate farm function 610-1, validate public IP function 610-2, validate virtual server function 610-3, validate physical server function 610-4, validate private IP function 610-5, validate application pre-requisites function 610-6, get free disk space function 610-6-1, validate all function 610-7, and generate ticket function 610-8.

Validate farm function 610-1 may determine whether resources are available for creating a farm or resource pool 605-1 and may be called or executed when a request for pool or farm provisioning has been submitted. In one implementation, execution of validate farm function 610-1 by resource management device 104-3 may initially determine whether a resource pool 605-1 is available (e.g., in a network of resource pools). This may be performed by querying resource manager database 104-2 and/or IP address management device 110-1 to determine whether a farm is available. It may also be determined whether a minimum of two public IP addresses 605-5 are available for allocation to the farm, e.g., by querying IP address management device 110-1. In some implementations, execution of validate farm function 610-1 may also cause resource management device 104-3 to determine whether a fault tolerant group (FTG) index is available. In addition, it may be determined whether a bastion server is available for use by a new farm. A bastion server is a device configured to provide access to other servers or devices in a particular farm. In some instances, the bastion server may be "hardened" to receive and withstand malicious attacks. An output of validate farm function 610-1 may include a TRUE value when all requested resources are available and a FALSE value when at least one of the requested resources is determined to be unavailable.

Validate public IP function 610-2 may determine whether resources are available for creating or allocating a public IP address and may be called or executed when a request for VIP provisioning has been submitted. In one implementation, execution of validate public IP function 610-2 by resource management device 104-3 may determine whether a public IP address 605-5 is available for allocation to a VIP. This may be done by querying IP address management device 110-1. In one implementation, validate public IP function 610-2 may include as an input parameter, a quantity indicating a number of public IP addresses requested. An output of validate public IP function 610-2 may include a TRUE value when the requested number of public IPs are available and a FALSE value when the requested number of public IPs are determined to be unavailable.

Validate virtual server function 610-3 may determine whether resources are available for provisioning a virtual server or VM and may be called or executed when a request for server provisioning has been submitted. In one implementation, execution of validate virtual server function 610-3 by resource management device 104-3 may determine whether a private IP address 605-6 is available for each VM 605-2 to be provisioned (e.g., by querying IP address management device 110-1) and whether a virtual center associated with the VM(s) has enough capacity for the requested VM(s) (e.g., by querying VMM control device 105-2 and/or resource manager database 104-2). In one implementation, validate virtual server function 610-3 may receive as an input parameter, an indication of an array of VMs to be provisioned. An output of validate virtual server function 610-3 may include a TRUE value when it is determined that all requested VMs can be built and a FALSE value when it is determined that all of the requested VMs cannot be built.

Validate physical server function 610-4 may determine whether resources are available for provisioning a physical server and may be called or executed when a request for server provisioning has been submitted. In one implementation, execution of validate physical server function 610-4 by resource management device 104-3 may determine whether a private IP address 605-6 is available for each physical server 605-3 to be provisioned (e.g., by querying IP address management device 110-1) and whether server blades 605-8 corresponding to the number of requested servers are available for provisioning. In one implementation, validate physical server function 610-4 may receive as an input parameter, an indication of an array of physical servers to be provisioned. An output of validate physical server function 610-4 may include a TRUE value when it is determined that all requested physical servers can be provisioned and a FALSE value when it is determined that all of the requested physical servers cannot be provisioned.

Validate private IP function 610-5 may determine whether a number of private IP addresses are available for reservation and may be called or executed when a request for IP addresses on a DMZ (demilitarized zone) or TRUST portion of a network. In one implementation, execution of validate private IP function 610-5 by resource management device 104-3 may determine whether private IP addresses 605-6 are available (e.g., by querying IP address management device 110-1). In one implementation, validate private IP function 610-5 may receive, as an input parameter, an indication of the portion of the network (e.g., DMZ or TRUST) for the requested IP addresses and a number of IP addresses requested. An output of validate private IP function 610-5 may include a TRUE value when the requested number of private IPs are available and a FALSE value when the requested number of private IPs are determined to be unavailable.

Validate application pre-requisites function 610-6 may determine whether memory and storage space associated with a particular server is sufficient to enable installation of an identified application or application type. In one implementation, execution of validate application pre-requisites function 610-6 by resource management device 104-3 may cause a synchronous request to be executed by workflow engine 106-1 to request space and memory availability in an identified server via network management device 106-3.

In other words, validate application pre-requisites function 610-6 may cause get free disk space function 610-6-1 to be transmitted to workflow engine 106-1 for immediate action and response to resource management device 104-3. Get free disk space function 610-6-1, when executed by workflow engine 106-1, causes network management device 106-3 to identify free space and/or server access success/failures for an identified server and IP address. In one implementation, execution of get free disk space function 610-6-1 may be initiated via a specifically formed uniform resource locator (URL) and a response from network management device 106-3 may be returned to resource management device 104-3 via an extensible markup language (XML)-formatted response. The response may be parsed to determine whether the returned space/access values are suitable for installation of an identified application or application type. The response from network management device 106-3 may be forwarded to resource management device 104-3 and compared to requirements associated with the identified application.

An output of validate application prerequisites function 610-6 may include a TRUE value when the space on the identified server is suitable for installation of the identified application and a FALSE value the space on the identified server is not suitable for installation of the identified application. In some implementations, validate application prerequisites function 610-6 may be called or executed upon saving of an application installation design and not only in response to a request to provision or build the design.

Validate all function 610-7 may aggregate performance of functions 610-1 to 610-6-1. In one implementation, execution of validate all function 610-7 by resource management device 104-3 may include, as an input, an array or listing of resources to be provisioned, such as a resource pool, an application, a VIP, a physical server, or a virtual server. In response, each of functions 610-1 to 610-6-1 corresponding to the requested resources may be called or executed.

Contrary to individual functions 610-1 to 610-6, described above, output for validate all function 610-7 may include arrays of strings specific to the pre-validation result for each type of resource requested. For example, an empty array of strings may be output when all requested resources are available. However, for each requested resource that the pre-validation function results in a FALSE output value, a descriptive string may be provided for presentation to the requesting user.

For example, if the array contains "FARM" the resource management device 104-3 may phrase an error message such as: "The system cannot provision the farm at this time. A ticket has been opened and staff has been notified." Further, if the array contains both "VIP" and "PHYSICAL SERVER", resource management device 104-3 can phrase an error message such as: "The system cannot provision all VIPs and all physical servers at this time. A ticket has been opened and staff has been notified."

For requested application resources, when it is determined that sufficient resources for installing an application are not available (e.g., based on the output of functions 610-6 and 610-6-1), an array for each individual application may be generated indicating that the application cannot be installed. As described in additional detail below, the generated strings may be provided by resource management device 104-3 to portal device 102-1 or 102-2 for display to the requesting user.

Generate ticket function 610-8 may be called when an FALSE or non-empty output strings are generated based on the execution of functions 610-1 to 610-7. Consistent with implementations described herein, identification of at least one FALSE or fault text string may cause a message or alert to be output to network services or support personnel. In one implementation, details relating to the resource deficiency may be provided in the alert message.

In the above, the functions that are listed in FIG. 6 may be used to pre-validate the availability of requested network or server resources. Other network devices and/or networks 102-112 may use different functions to pre-validate other types of resources (e.g., physical devices, machine access control (MAC) addresses, IP addresses, logical volume, etc.) and/or to control workflow processes.

Figure 7A:
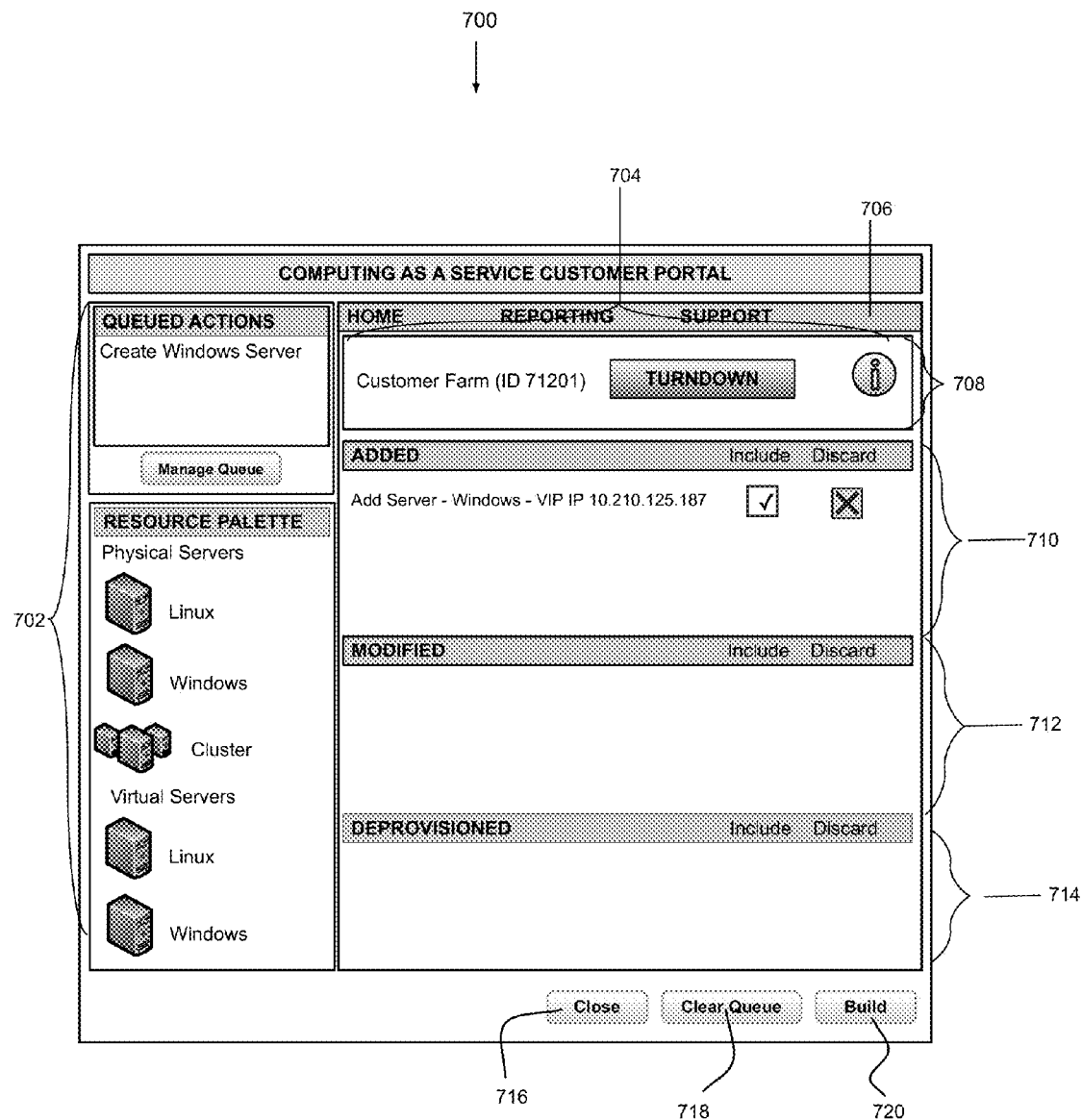
FIGS. 7A-7B illustrates an exemplary view of a web-based user interface for provisioning computing resources.

FIG. 7A illustrates an exemplary view 700 of a web-based user interface for controlling, monitoring, provisioning, and/or de-provisioning resources. More specifically, view 700 shows a web page for presenting resources that a user has requested for provisioning, e.g., a to-be-built page depicting resources listed prior to building on virtual or physical devices. Some features of a typical web browser, such as navigation bar, are not illustrated for the sake of ease in presentation. Depending on the implementation, the web page may include additional, fewer, or different features than those shown in FIGS. 7A-7B.

As shown, the web page may include a side pane 702 and a main pane 704. Side pane 702 may include a list or "palette" of available server types, and a listing of jobs that are pending for execution (e.g., by workflow engine 106-1). Main pane 704 may include menu bar 706, short cut buttons 708, and "Added" resources section 710, "Modified" resources section 712, and "Deprovisioned" resources section 714. Menu bar 706 may provide links to other web pages, such as "Home," "Reporting," or "Support" page. Short cut buttons 708 includes buttons for executing commands "turndown" or additional information.

"Added" resources section 710 may include a listing of resources requested for provisioning by the user. As shown, "Added" resources section 710 in FIG. 7A includes a request to add a Windows server having a VIP with a particular IP address. For each resource listed, selections are provided to include the resource in a build and delete or discarding the resource from the build list. "Modified" resources section 712 may include a listing of resources requested for change and "Deprovisioned" resources section 714 may include a listing of resources selected for deprovisioning.

The web page may include options relating to submission of the resource provisioning request. For example, the web page may include a "Close" option 716, a "Clear Queue" option 718, and a "Build" option 720. User selection of "Close" option 716 keeps resources in the build page, but closes it for later modification or submission (e.g., building). User selection of "Clear Queue" option 718 removes any requested resource changes in the web page. User selection of "Build" option 720 initiates pre-provisioning of the requested resources in the manner described above. In the event that no pre-validation errors are identified, provisioning of the requested resources may follow automatically.

Figure 7B:
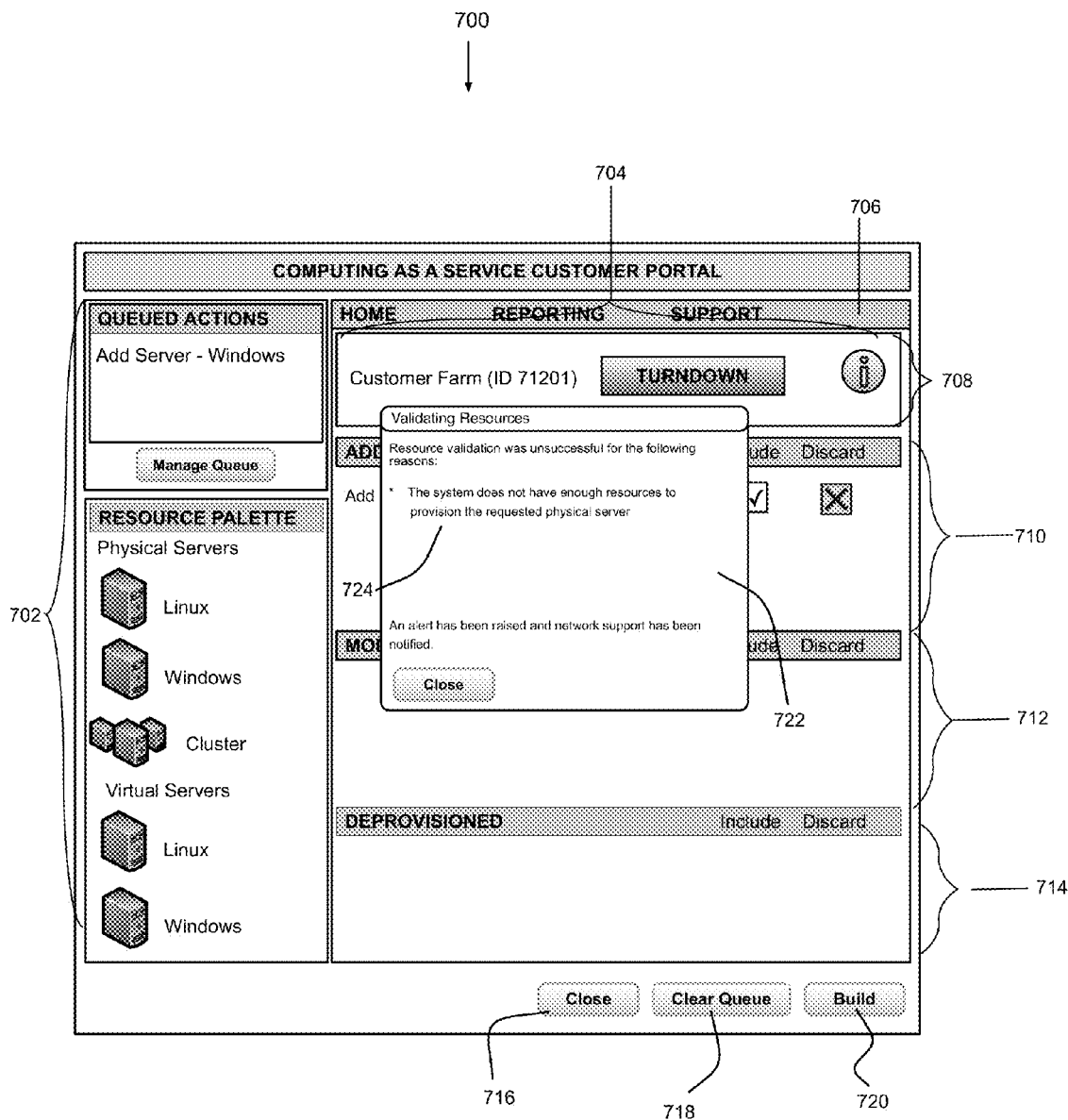

FIG. 7B illustrates an exemplary view 700 following user selection of "Build" option 720 and, in which at least one requested resource has been determined to be unavailable via the pre-validation functions described above. That is, resource management device 104-3 determines that pre-validation is unsuccessful for at least one of the requested resources. As shown, identification of at least one pre-validation failure may cause a user Validating Resources dialog 722 to display an error or failure notification message 724. For example, as shown in FIG. 7B, failure notification message 724 may indicate that the requested physical server is not available. In exemplary implementations, failure notification message 724 may be presented soon after receipt of the user selection of "Build" option 720. In this manner, the user is quickly notified about a resource availability issue, in contrast to failures or errors that may be identified during the execution of workflow functions queued in jobs database device 104-1 by workflow engine 106-1 or other components in network 100.

FIG. 8A is a flow diagram of an exemplary process that is associated with pre-validating customer-requested resources in a computing as a service system. Although networks 104-112 may implement other processes for pre-validating, provisioning, de-provisioning, monitoring, and/or controlling other resources, they are not illustrated for the sake of simplicity and ease of understanding.

Process 800 may begin upon receipt of a request to provision a resource (block 802). For example, customer web portal device 102-2 may provide user interface view 700 to user device 130 that includes a build or provision option 720. Prior to providing interface view 700 to the user, customer web portal device 102-2 may have provided other resource configuration views or web pages for receiving resource selections and configuration information, such as port numbers, numbers of virtual or physical machines, load balancer/ firewall configuration settings, etc.

Customer web portal device 102-2 may receive a selection of "Build" option 720. In response to the build request, resource management device 104-3 may identify one or more of functions 610-1 to 610-7 for execution based on the requested resources (block 804). For example, if the request is a request for a virtual server, validate virtual server function 610-3 may be identified. In instances in which several resources are requested, resource management device 104-3 may identify validate all function 610-7 for execution.

Output results may be identified based on the executed pre-validation function or functions (block 806). Resource management device 104-3 may determine whether one or more of the executed pre-validation functions 610-1 to 610-7 resulted in a FALSE value or a non-empty text string (in the event that validate all function) (block 808). If none of the called pre-validation function returned an error (e.g., a FALSE or non-empty text string) (block 808—NO), resource management device 104-3 may add or queue one or more jobs relating to the provisioning to jobs database device 104-1 for execution by workflow engine 106-1 in the manner described above (block 810). The queued jobs may be dequeued by workflow engine 106-1 in the manner described above (block 812) and executed to provision the requested resource(s) (block 814).

When one or more of the called pre-validation functions returned an error (e.g., a FALSE or non-empty text string) (block 808—YES), resource management device 104-3 may display an alert message to the user based on the identified error (block 816). In some implementations, resource management device 104-3 may also generate an entry in an error log relating to the unsuccessful pre-validation. The log entry may include provided exception or alert message and a trace of the functions resulting in the alert. In addition, resource management device 104-2 may also generate an error ticket and transmit the ticket to network service personnel for additional resolution (block 818).

Figure 8:
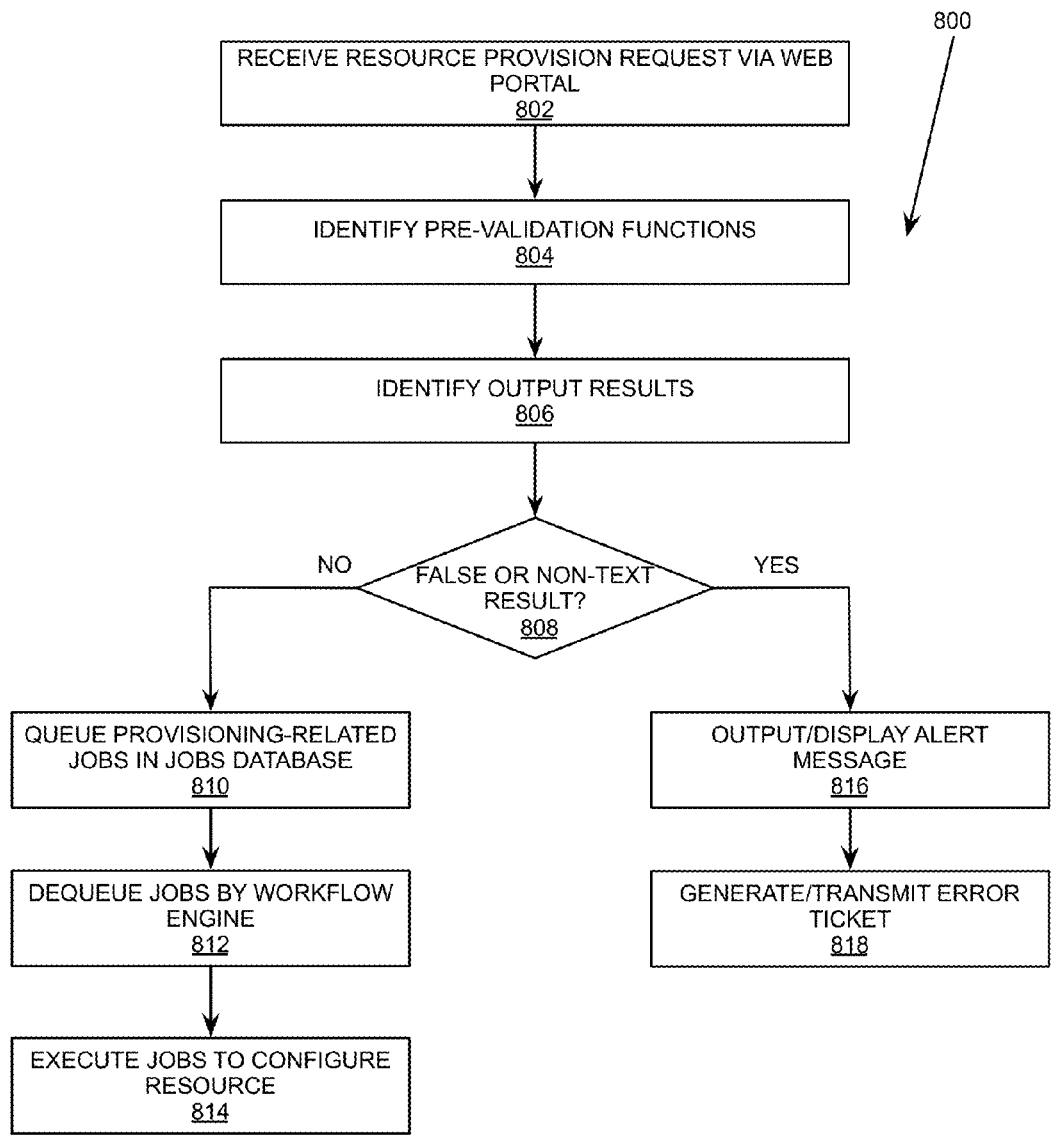
FIG. 8 is a flow diagram of an exemplary process that is associated with pre-validating customer-requested resources in a computing as a service system.
Figure 9A:
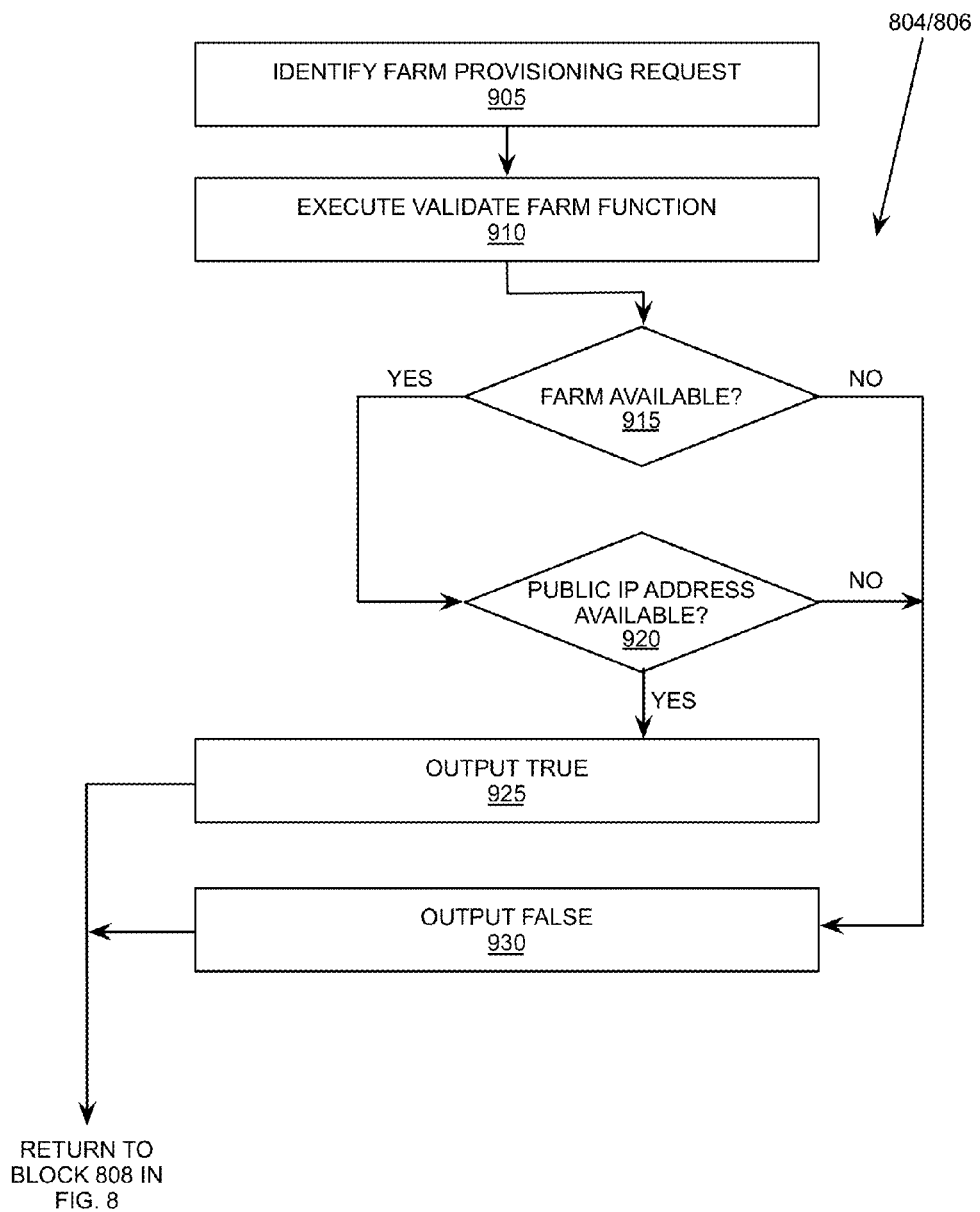
FIGS. 9A-9E are flow diagrams of exemplary pre-validation steps in the processing of FIG. 8.
Figure 9B:
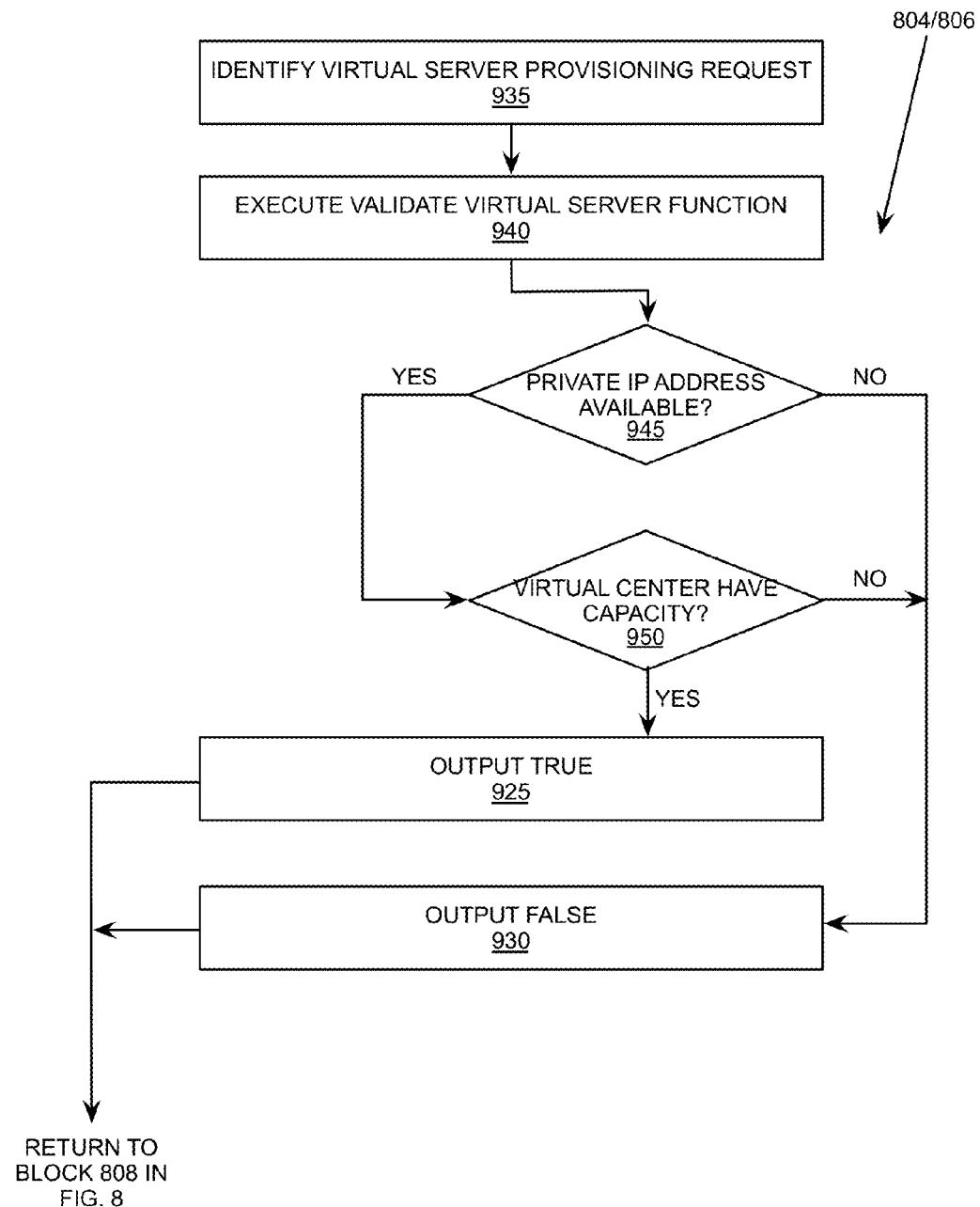
Figure 9C:
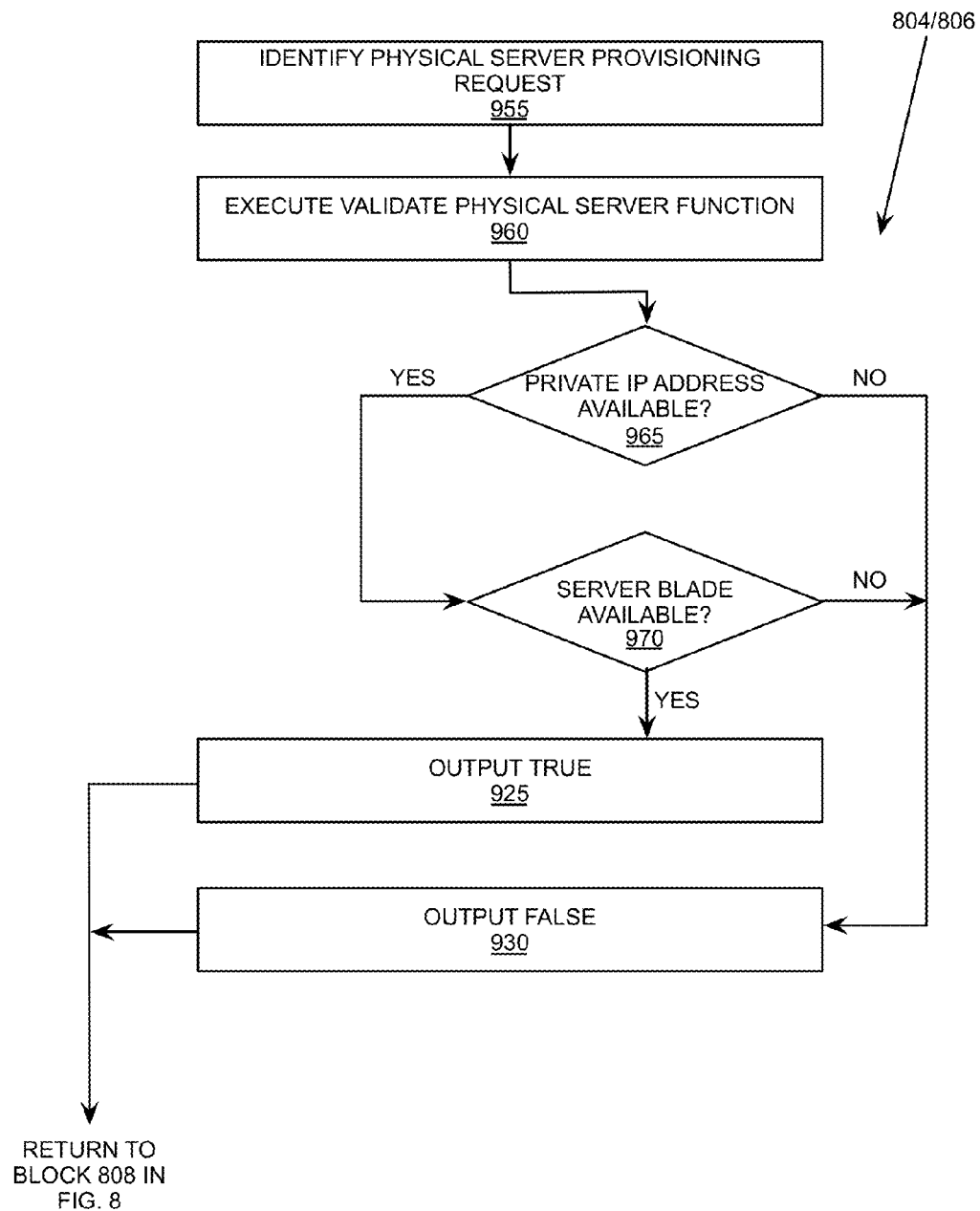
Figure 9D:
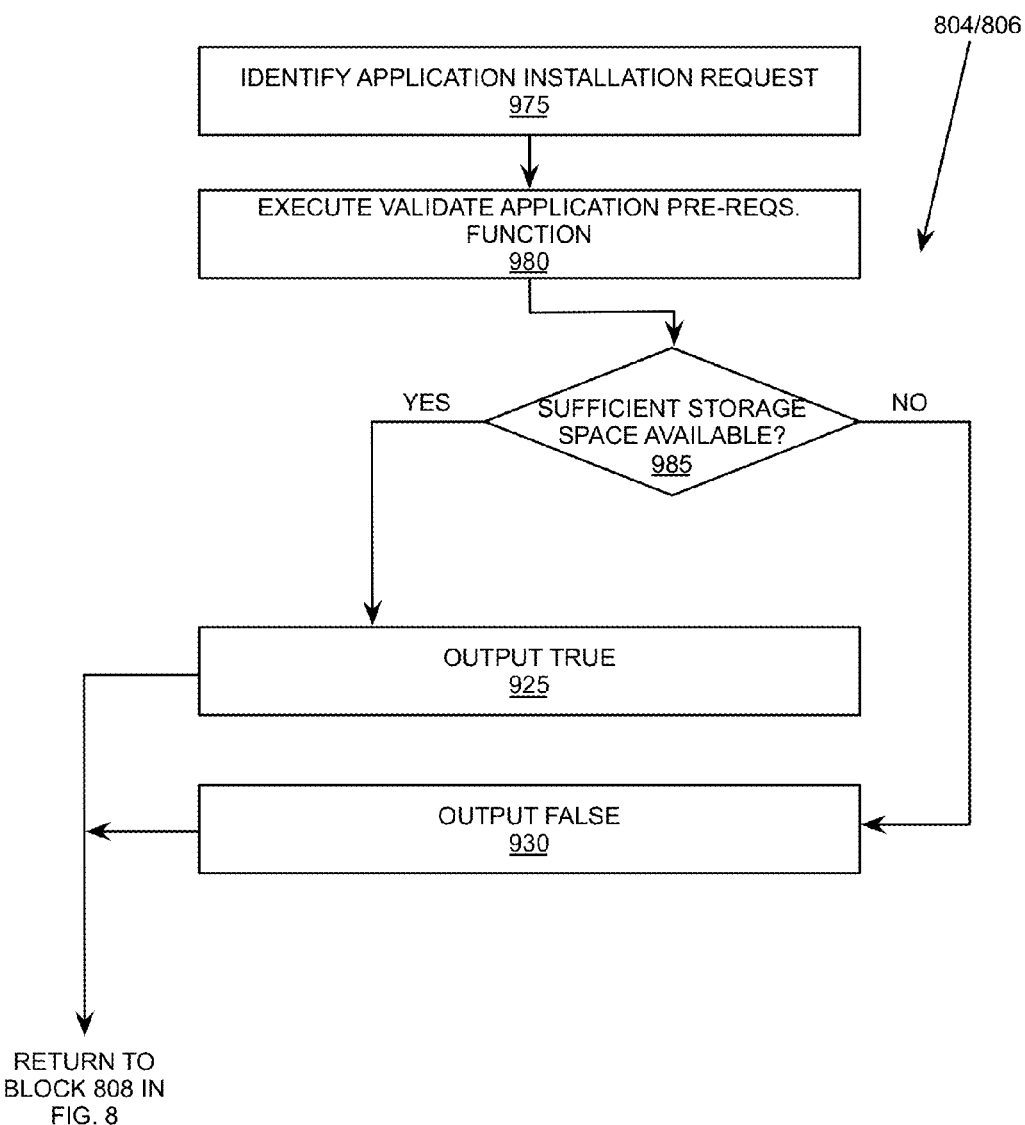

FIGS. 9A-9D are flow diagrams of exemplary pre-validation steps 804/806 in the processing of FIG. 8. More specifically, FIG. 9A illustrates processing associated with a farm provisioning request, FIG. 9B illustrates processing associated with a virtual server provisioning request, FIG. 9C illustrates processing associated with a physical server provisioning request, and FIG. 9D illustrates processing associated with an application installation request.

In FIG. 9A, resource management device 104-3 may receive a request (e.g., via web portal device 102-2) for provisioning of a farm (block 905). In response resource management device 104-3 may execute validate farm function 610-1 (block 910). As described above, validate farm function 610-1 may cause resource management device 104-3 to determine whether a farm is available for provisioning (block 915) and whether a public IP address is available for allocation to the farm (block 920).

If it is determined that the answer to either of these inquiries is no, (e.g., block 915—NO or block 920—NO), validate farm function 610-1 may return False as an output (block 930). However, if is determined that the answer to both of these inquiries is yes, (e.g., block 915—YES and block 920—YES), validate farm function 610-1 may return True as the output. Processing may then return to block 808 in FIG. 8, described above.

In FIG. 9B, resource management device 104-3 may receive a request (e.g., via web portal device 102-2) for provisioning of a virtual server device (block 935). In response resource management device 104-3 may execute validate virtual server function 610-3 (block 940). As described above, validate virtual server function 610-3 may cause resource management device 104-3 to determine whether a private IP address is available for allocation to a virtual server (block 945) and whether a virtual center has sufficient capacity to support the provisioning of a virtual server (block 950).

As described above in relation to FIG. 9A, if it is determined that the answer to either of these inquiries is no, (e.g., block 945—NO or block 950—NO), validate virtual server function 610-3 may return False as an output (block 930). However, if is determined that the answer to both of these inquiries is yes, (e.g., block 945—YES and block 950—YES), validate virtual server function 610-3 may return True as the output. Processing may then return to block 808 in FIG. 8, described above.

In FIG. 9C, resource management device 104-3 may receive a request (e.g., via web portal device 102-2) for provisioning of a physical server device (block 955). In response resource management device 104-3 may execute validate physical server function 610-4 (block 960). As described above, validate physical server function 610-4 may cause resource management device 104-3 to determine whether a private IP address is available for allocation to a physical server (block 965) and whether a physical server blade is available for provisioning of a physical server (block 970).

As described above in relation to FIG. 9A, if it is determined that the answer to either of these inquiries is no, (e.g., block 965—NO or block 970—NO), validate virtual server function 610-3 may return False as an output (block 930). However, if is determined that the answer to both of these inquiries is yes, (e.g., block 965—YES and block 970—YES), validate physical server function 610-4 may return True as the output. Processing may then return to block 808 in FIG. 8, described above.

In FIG. 9D, resource management device 104-3 may receive a request (e.g., via web portal device 102-2) for installation of a particular application (e.g., on a provisioned server device) (block 975). In response resource management device 104-3 may execute validate application pre-requisites function 610-6 (block 980). As described above, validate application pre-requisites function 610-6 may cause resource management device 104-3 to determine whether sufficient storage space is available on the identified server device to support installation of the application (block 985).

If it is determined that sufficient storage space is not available on the identified server device to support installation of the application, (block 985—NO), validate application pre-requisites function 610-6 may return False as an output (block 930). However, if is determined that sufficient storage space is available on the identified server device to support installation of the application (e.g., block 985—YES), validate application installation function 610-6 may return True as the output. Processing may then return to block 808 in FIG. 8, described above.

Figure 9E:
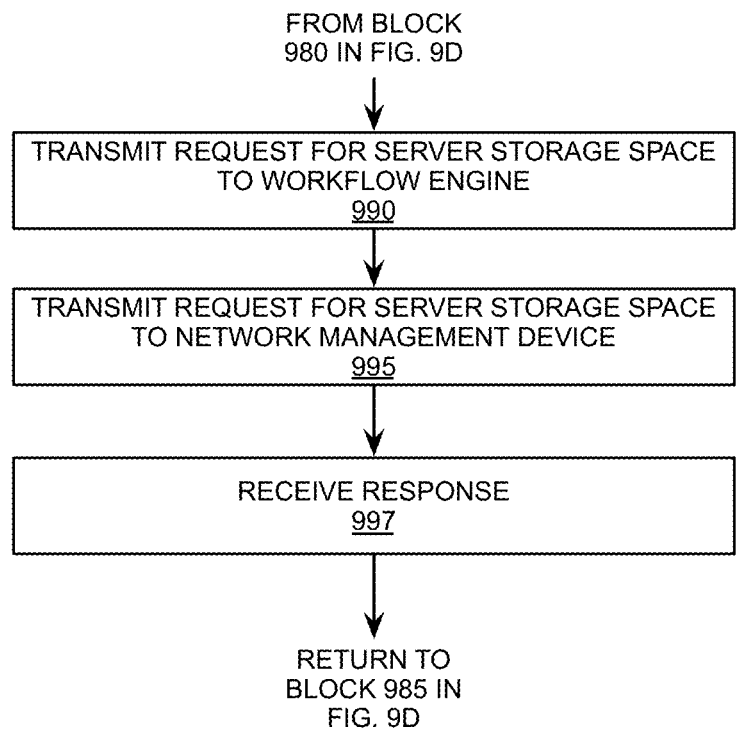

FIG. 9E is a flow diagram illustrating exemplary processing associated with block 985 of FIG. 9D. As shown, resource management device 104-3 may transmit a request (e.g., a synchronous request) to workflow engine 106-1 for an amount of storage space on the identified server device (block 990). In response, workflow engine 106-1 may transmit a request to network management device 106-3 for the amount of storage space on the identified server device (block 995). Resource management device 104-3 may receive a response from network management device 106-3 via workflow engine 106-1 relating to the amount of storage space available on the server. Processing may return to block 985 in FIG. 9D.

The above specification describes how a system may pre-validate resource provisioning requests in a computing as a service system. When a user wishes to obtain or configure such resources (e.g., a establish a VIP, configure a firewall, obtain an IP address, etc.), the user may connect to an integrated provisioning system via a web portal. Once connected via a web interface, the user may input parameters that describe the desired resources. Based on the parameters, the integrated resource provisioning system may perform one or more pre-validation functions to quickly determine whether resources are available to satisfy the user request. If it is determined that one or more of the requested resources is not available, the user may be alerted to the issue and an alert ticket may be automatically forwarded to network services personnel for handling.

The foregoing description of exemplary implementations provides illustration and description, but is not intended to be exhaustive or to limit the embodiments described herein to the precise form disclosed. Modifications and variations are possible in light of the above teachings or may be acquired from practice of the embodiments.

Further, while series of acts have been described with respect to FIG. 8, the order of the acts may be varied in other implementations. Moreover, non-dependent acts may be implemented in parallel.

It will also be apparent that various features described above may be implemented in many different forms of software, firmware, and hardware in the implementations illustrated in the figures. The actual software code or specialized control hardware used to implement the various features is not limiting. Thus, the operation and behavior of the features of the invention were described without reference to the specific software code—it being understood that one would be able to design software and control hardware to implement the various features based on the description herein.

Further, certain features described above may be implemented as "logic" that performs one or more functions. This logic may include hardware, such as one or more processors, microprocessors, application specific integrated circuits, or field programmable gate arrays, software, or a combination of hardware and software.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

No element, act, or instruction used in the description of the present application should be construed as critical or essential to the invention unless explicitly described as such. Also, as used herein, the article "a" is intended to include one or more items. Further, the phrase "based on" is intended to mean "based, at least in part, on" unless explicitly stated otherwise.

What is claimed is:

1. A computing-device implemented method comprising:
   receiving, from a user, a request to provision one or more computing resources based on configuration information, wherein the one or more computing resources comprise one or more of: a resource pool, a virtual server, a physical server, a public Internet protocol (IP) address, or an application installation on an identified server associated with the user;
   pre-validating the one or more computing resources, wherein the pre-validating comprises determining whether the one or more computing resources are available for allocation to the user,
   wherein, when the one or more computing resources comprises the application installation, the pre-validating comprises:
      determining whether memory and storage space on the identified server is sufficient to accommodate installation of the application; and
      determining that the pre-validating is unsuccessful when it is determined that sufficient memory and storage space on the identified server is not available;
   performing, when the pre-validating for all of the one or more computing resources is not successful:
      outputting an alert message to the user indicating that one or more of the requested computing resources is not available;
   performing, when the pre-validating for all of the one or more computing resources is successful:
      queuing one or more jobs in a jobs database based on the request to provision the one or more computing resources;
      dequeing the one or more jobs by a workflow engine; and
      executing the one or more jobs to configure the one or more computing resources.

2. The method of claim 1, further comprising:
   providing a graphical user interface to the user via a web portal; and
   receiving the request to provision the one or more computing resources during an interface session via the graphical user interface; and
   outputting the alert message via the graphical user interface during the interface session.

3. The method of claim 1, wherein the request to provision the one or more computing resources based on configuration information is received by a resource management device.

4. The method of claim 1, wherein the request to provision the one or more computing resources comprises a request to provision more than one of: the resource pool, the virtual server, the physical server, the public Internet protocol (IP) address, and the application installation, the method further comprising:
- pre-validating each of the more than one computing resources;
- generating an array of strings that includes entries corresponding to pre-validation results for each of the more than one computing resources; and
- generating the output message based on the array of strings.

5. The method of claim 1, wherein receiving the request to provision one or more computing resources comprises receiving a request to provision the resource pool,
- wherein the pre-validating comprises:
  - determining whether the resource pool is available;
  - determining whether a number of public IP addresses are available for allocating to the resource pool, wherein the number of public IP addresses have not been previously allocated to the user; and
  - determining that the pre-validating is unsuccessful when the resource pool is not available or the number of public IP addresses are not available.

6. The method of claim 5, wherein determining whether the resource pool is available comprises querying a resource manager database to determine whether the resource pool is available, and
- wherein determining whether the number of public IP addresses are available comprises querying an IP address management device to determine whether the number of public IP addresses are available.

7. The method of claim 1, wherein receiving the request to provision the one or more computing resources comprises receiving a request to provision one or more virtual servers,
- wherein the pre-validating comprises:
  - determining whether a private IP address is available for each of the one or more virtual servers to be provisioned, wherein the private IP address has not been previously allocated to the user;
  - determining whether a virtual center has capacity to accommodate the one or more virtual servers; and
  - determining that the pre-validating is unsuccessful when private IP addresses are not available for each of the one or more virtual servers or when the virtual center does not have capacity for the one or more virtual servers.

8. The method of claim 7, wherein determining whether the private IP addresses are available comprises querying an IP address management device to determine whether the private IP addresses are available, and
- wherein determining whether the virtual center has capacity to accommodate the one or more virtual servers comprises querying a virtual machine management control device to determine whether the virtual center has capacity to accommodate the one or more virtual servers.

9. The method of claim 1, wherein receiving the request to provision the one or more computing resources comprises receiving a request to provision one or more physical servers,
- wherein the pre-validating comprises:
  - determining whether a private IP address is available for each of the one or more physical servers to be provisioned;
  - determining whether one or more server blades corresponding to the one or more physical servers are available; and
  - determining that the pre-validating is unsuccessful when private IP addresses are not available for each of the one or more physical servers or when the one or more server blades for the one or more physical servers are not available.

10. The method of claim 9, wherein determining whether the one or more server blades corresponding to the one or more physical servers are available comprises querying a resource management database to determine whether the one or more server blades corresponding to the one or more physical servers are available.

11. The method of claim 1, wherein determining whether the memory and storage space on the identified server is sufficient to accommodate installation of the application comprises:
- transmitting a request to the workflow engine to identify an amount of storage space on the identified server;
- transmitting a request, by the workflow engine, to identify the amount of storage space on the identified server to a network management device associated with the identified server;
- receiving, by the workflow engine, the identified amount of storage space on the identified server from the network management device associated with the identified server;
- receiving the identified amount of storage space on the identified server; and
- comparing the identified amount of storage space on the identified server to requirements associated with the application.

12. The method of claim 11, wherein the request, by the workflow engine, for the amount of storage space comprises a formatted uniform resource locator (URL), and wherein the response to the request, by the workflow engine, for the amount of storage space comprises an extensible markup language document that includes the amount of storage space.

13. The method of claim 1, further comprising, transmitting an error ticket to network management personnel when the pre-validating for all of the one or more computing resources is not successful.

14. A system comprising:
- a web portal device comprising a first processor to:
  - provide a user interface portal for receiving a request, from a user, to provision one or more computing resources,
  - wherein the one or more computing resources comprise one or more of: a resource pool, a virtual server, a physical server, a public Internet protocol (IP) address, or an application installation on an identified server associated with the user;
  - wherein the user interface portal includes a graphical user interface;
- a resource management device comprising a second processor to:
  - receive the computing resource provisioning request from the web portal device;
  - pre-validate an availability of the one or more computing resources based on the computing resource provisioning request, wherein the second processor to pre-validate is further configured to determine whether the one or more computing resources are available for allocation to the user,
  - wherein, when the one or more computing resources comprises the application installation, the second processor to pre-validate is further configured to:
    - determine whether memory and storage space on the identified server is sufficient to accommodate installation of the application;

determine that the pre-validating is unsuccessful when it is determined that sufficient memory and storage space on the identified server is not available;

output an alert message to the user indicating that one or more of the requested computing resources are not available via the graphical user interface when the pre-validating for all of the one or more computing resources is not successful; and queue one or more jobs in a jobs database based on the request to provision the one or more computing resources when the pre-validating for all of the one or more computing resources is successful; and a workflow engine device comprising a third processor to:
drive an execution of the jobs in the database, the jobs comprising instructions for one or more of devices in the system to provision the one or more computing resources.

15. The system of claim 14, wherein the request to provision the one or more computing resources comprises a request to provision more than one of the resource pool, the virtual server, the physical server, the public Internet protocol (IP) address, and the application, and wherein the second processor to pre-validate is further configured to:
pre-validate each of the more than one computing resources;
generate an array of strings that includes entries corresponding to pre-validation results for each of the more than one computing resources; and
generate the output message based on the array of strings.

16. The system of claim 15, wherein the second processor of the resource management device is further configured to:
receive a request to provision one or more virtual servers,
determine whether a private IP address is available for each of the one or more virtual servers to be provisioned, wherein the private IP address has not been previously allocated to the user;
determine whether a virtual center has capacity to accommodate the one or more virtual servers; and
determine that the pre-validating is unsuccessful when private IP addresses are not available for each of the one or more virtual servers or when the virtual center does not have capacity for the one or more virtual servers.

17. The system of claim 15, wherein the second processor of the resource management device is further configured to:
receive a request to provision one or more physical servers,
determine whether a private IP address is available for each of the one or more physical servers to be provisioned;
determine whether one or more server blades corresponding to the one or more physical servers are available; and
determine that the pre-validating is unsuccessful when private IP addresses are not available for each of the one or more physical servers or when the one or more server blades for the one or more physical servers are not available.

18. The system of claim 15, wherein the second processor of the resource management device is further configured to:
receive a request to install an application on an identified server;
determine whether storage space on the identified server is sufficient to accommodate installation of the application; and
determine that the pre-validating is unsuccessful when it is determined that sufficient storage space on the identified server is not available.

19. Non-transitory computer-readable media comprising computer executable instructions for causing one or more processors to:
receive a request, from a user, to provision one or more computing resources based on configuration information,
wherein the one or more computing resources comprise one or more of: a resource pool, a virtual server, a physical server, a public Internet protocol (IP) address, or an application installation on an identified server associated with the user;
pre-validate an availability of the one or more computing resources, wherein the instructions for causing one or more processors to pre-validate further cause the one or more processors to determine whether the one or more computing resources are available for allocation to the user,
wherein, when the one or more computing resources comprises the application installation, the instructions further cause the one or more processors to:
determine whether memory and storage space on the identified server is sufficient to accommodate installation of the application; and
determine that the pre-validating is unsuccessful when it is determined that sufficient memory and storage space on the identified server is not available;
output an alert message to the user indicating that one or more of the requested computing resources is not available, when pre-validation for all of the one or more computing resources is not successful; and
when pre-validation for all of the one or more computing resources is successful, causing the one or more processors to:
queue one or more jobs in a jobs database based on the request to provision the one or more computing resources;
dequeue the one or more jobs by a workflow engine; and
execute the one or more jobs to configure the one or more computing resources.

* * * * *